United States Patent [19]

LaValley

[11] Patent Number: 4,795,572
[45] Date of Patent: Jan. 3, 1989

[54] REPLACEABLE TRUNNION SEAL

[75] Inventor: Richard W. LaValley, Vancouver, Wash.

[73] Assignee: LaValley Industrial Plastics, Inc., Vancouver, Wash.

[21] Appl. No.: 9,770

[22] Filed: Feb. 2, 1987

[51] Int. Cl.$^4$ .............................................. B01D 33/06
[52] U.S. Cl. ................................. 210/784; 210/232; 210/402; 277/1; 277/9; 277/87
[58] Field of Search ............... 210/784, 232, 402, 404, 210/406; 162/272, 323, 335, 357, 368; 277/9, 85, 87, 93 R, 93 SD, 106, 226, 1

[56] References Cited

U.S. PATENT DOCUMENTS

| | | | |
|---|---|---|---|
| 2,292,276 | 8/1942 | Knoll | 210/402 |
| 2,455,539 | 12/1948 | Wahl | 277/93 |
| 2,489,681 | 11/1949 | Smith et al. | 210/402 |
| 2,673,748 | 3/1954 | Shaw | 210/402 |
| 3,350,113 | 10/1967 | Ahlstone | 277/9 |
| 4,124,218 | 11/1978 | Wentworth, Jr. | 277/9 |
| 4,248,716 | 2/1981 | LaValley | 210/402 |
| 4,417,734 | 11/1983 | Sundberg | 277/9 |
| 4,608,170 | 8/1986 | LaValley | 210/404 |

Primary Examiner—Richard V. Fisher
Assistant Examiner—Linda S. Evans
Attorney, Agent, or Firm—Marger & Johnson

[57] ABSTRACT

The novel sealing means of this invention generally comprises a replaceable, annular-shaped sealing device having a substantially L-shaped radial cross-sectional configuration for effecting the indirect fluid-tight sealing of an entry passageway formed at the entrance to either of the channel means. The L-shaped radial cross section of the sealing device comprises an axially-extending base section capable of extending within and effectively sealing off, in a fluid-tight manner, either of the entry passageways. The sealing device also includes a radially-extending leg section capable of facilitating the effective sealing of either of the entry passageways and for maintaining the sealing device in a substantially fixed position within the entry passageway means by the securing engagement of the inner radial surface of the leg section with the outer end of either of the respective trunnion and the inner vat insert element. The above-described fluid-tight sealing of the entry passageway means, and in turn the channel means, is completed by the securing engagement of the lower axial surface of the base section and the outer surface of either of the respective stationary discharge pipe and trunnion.

31 Claims, 4 Drawing Sheets

REPLACEABLE TRUNNION SEAL

BACKGROUND OF THE INVENTION

This invention relates to a replaceable sealing means and to a replaceable sealing means system for providing fluid-tight sealing means defining an annularly-shaped, axially-extending channel of a rotary vacuum filter, such as the rotary vacuum filter employed in the manufacture of cellulosic papermaking pulp.

Rotary vacuum filters are known in the prior art. Typically, the filter drum is mounted for rotation about a central axis and has a hollow trunnion disposed at one end. The hollow trunnion is connected at its inner end to the drum end wall and rotatably connected at its outer end to a stationary vacuum discharge pipe. The stationary vacuum pipe is in communication with a source of vacuum to drain the filtrate material from the drum as it rotates about its central axis. A vat insert assembly (stuffing box) extends axially about the hollow trunnion. The assembly comprises a radially-extending vat wall joined to a vat insert member including concentrically-disposed respective inner and outer axially-extending, annularly-shaped vat insert elements.

A means defining an annularly-shaped, axially-extending channel is formed between the respective outer surface of the discharge pipe and the inner wall of the hollow trunnion, and between the respective inner surface of the inner vat insert element and the outer surface of the hollow trunnion. Stationary abrasive packing material fills both of these channel means and provides a direct fluid-tight seal by direct engagement between the packing material and the adjacent surfaces of the vat insert or the pipe and the trunnion, respectively. The stationary packing material bears against, for example, the wall of the rotatable trunnion and subjects such trunnion wall to substantial direct abrasive wear. A mechanical follower engages the packing material and holds same in position within the channel means in direct communication with the surfaces forming such channel means. In the case of the trunnion, this presents a substantial problem. The inner wall of the trunnion is typically lined with an abrasion- and chemical-resistant material, such as stainless steel, for withstanding the abrasion of the packing seal material and the chemical action of the pulp filtrate liquid which passes through the trunnion. When this lining no longer protects the inner wall of the hollow trunnion, it will be subject to rapid wear.

When the trunnion wears to the point that liquid cannot be effectively contained by the use of the abrasive packing sealing material and/or the drum filter cannot maintain sufficient vacuum to effect proper operation, the only means for correcting these problems is by replacing the entire trunnion itself. This results in a significant expense to the user because of the high replacement cost of a new trunnion, and because the trunnion installation process is time consuming and labor intensive. For instance, in addition to the cost of purchasing the packing material and mechanical follower, which amounts to about $2,500, the cost of a new trunnion is about $15,000, and the maintenance costs for replacing the trunnion are about $20,000 to $30,000.

The packing material itself also wears out because of the above-described abrasive interaction. This also causes substantial leaking, for instance, of the pulp filtrate liquid from the point of rotatable communication with the trunnion. A significant loss of vacuum in the drum filter may also result.

The most substantial cost to the manufacturer, however, results from the losses incurred due to unscheduled production downtime. More specifically, in order to replace a trunnion, the drum filter must be shut down for a considerable period of time, i.e., an average of 24 to 48 hours, while the faulty filter drum is repaired. Using a conservative estimate of $5,000 for each hour of lost production downtime, the average 24 to 48 hour downtime period for replacing the trunnion could result in a production loss to the manufacturer of almost a quarter of a million dollars.

Thus, there is a clear commercial need for a water-tight sealing system for use in rotary drum filters which does not subject the rotatable trunnion to direct excessive abrasive wear, and which is easily replaceable without removal of the trunnion, so that production downtime can be minimized and maintenance costs significantly reduced.

SUMMARY OF THE INVENTION

The present invention is directed to a replaceable sealing means and to a replaceable sealing means system for the effective and cost efficient fluid-tight sealing of means defining an annularly-shaped, axially-extending channel of a rotary vacuum filter.

The channel means requiring fluid-tight sealing are formed between a pair of axially-extending, concentric surfaces of a pair of concentric members. Typical channel means sealed by the replaceable sealing means of this invention are formed between concentric members comprising either of a discharge pipe and a vat insert element, and the hollow trunnion of a rotary vacuum filter, respectively. Thus, this desired fluid-tight sealing effect can be accomplished without requiring the use of conventional abrasive stationary packing material to prevent the above-described filtrate leakage and/or vacuum loss problems.

It has also been unexpectedly found that trunnions, incapable of averting leakage and/or substantial loss of vacuum using conventional abrasive packing material, are capable of effectively and efficiently sealing the channel means by employing the replaceable sealing means and system of this invention.

A fluid-tight seal of the channel means can be provided by the sealing means and sealing system of the subject invention without imparting direct excessive abrasive action to the walls of the hollow rotatable trunnion. Instead, this invention provides an indirect means of sealing the channel means by locating the sealing means within an annularly-shaped entry passageway formed at the entrance of the channel means, and in securing engagement with the radially-extending end of one of the concentric members and with the adjacent axially-extending surface of the other concentric member. The sealing means is preferably designed so that it does not cause substantial abrasive wear to the respective wall surfaces of the trunnion.

As compared to the conventional systems previously described herein, for example, the need for replacement of the entire hollow trunnion in the filter drum of a rotary vacuum filter is substantially avoided by the use of the sealing means of this invention. Avoiding the requirement for replacement of these trunnions eliminates maintenance and equipment costs from $37,500 to $47,500 each. Even when replacement of the sealing system of the present invention is required, the total installation cost is only about $2,500.

As for the cost to the manufacturer for lost production downtime, since the installation of the sealing system of this invention does not require removal of the trunnion, it will take only about two hours. Therefore, only about $10,000 in lost production downtime, not $240,000, will result when the subject sealing system is employed.

A further benefit of using the replaceable sealing means is that it can be employed to provide fluid-tight sealing of the channel means formed between concentric members, so that trunnions which are worn beyond the extent where they can be conventionally sealed employing the previously-described packing material can remain in use. The reason for this is that it has been now recognized that the sealing contact surface can be moved to a point other than within the channel means, such as to the outer end of either of the respective trunnion and the inner vat insert element. Thus, the useful life of an otherwise worn out trunnion can be substantially extended by employing the subject replaceable sealing means and the costs of operation can be dramatically reduced over time.

The novel sealing means of this invention generally comprises a replaceable, annular-shaped sealing device having a substantially L-shaped radial cross-sectional configuration for effecting the indirect fluid-tight sealing of an entry passageway formed at the entrance to either of the channel means. In this way, the sealing means does not direct excessive abrasive wear to the trunnion surface. Instead, the primary engagement surface is moved from within the channel means to a point outside the channel means.

The L-shaped radial cross section of the sealing device comprises an axially-extending base section capable of extending within and effectively sealing off, in a fluid-tight manner, either of the entry passageways. The sealing device also includes a radially-extending leg section capable of facilitating the effective sealing of either of the entry passageways and for maintaining the sealing device in a substantially fixed position within the entry passageway means by the securing engagement of the inner radial surface of the leg section with the outer end of either of the respective trunnion and the inner vat insert element. The above-described fluid-tight sealing of the entry passageway means, and in turn the channel means, is completed by the securing engagement of the lower axial surface of the base section and the outer surface of either of the respective stationary discharge pipe and trunnion. Typically, the sealing means of this invention is fabricated from a polymeric material, such as fiberglass and the like, which has high strength properties and is non-abrasive.

Preferably, further securing engagement between the base section and either of the discharge pipe and trunnion outer surfaces can be attained by including a flexible engagement means in the lower axial surface of the replacement sealing means. More particularly, the lower axial surface preferably includes at least one circumferentially-extending slot means, and the flexible engagement means preferably comprises at least one circumferentially-extending flexible annular ring, typically an O-ring fabricated of a flexible polymeric material, disposed within each slot means.

In another form of this invention, the inner radial surface includes flexible engagement means for providing further securing engagement between the leg section and the end of either the respective trunnion and lower vat insert element. Specifically, the inner radial surface can also include at least one annularly-extending slot means, and the flexible engagement means can also comprise at least one annularly-extending flexible annular ring disposed within each of the slot means.

In order to maintain the inner radial surface of the leg section in securing engagement with the outer end of either of the respective trunnion and lower vat insert element, the radially-extending leg section includes means for receiving axially-directed forces. When such forces are received, the inner radial surface of the leg section is maintained in securing engagement with these outer ends. This in turn maintains the fluid-tight engagement of the replacement sealing means base section within the entry passageway.

In a preferred form of the replacement sealing means of this invention, the outer radial surface of the leg section includes a plurality of annularly-arranged, axially-extending apertures capable of receiving retaining means for providing the previously-described axially-directed forces to the replacement sealing means, thus maintaining the inner radial surface of the leg section in securing engagement with the outer end of either of the respective trunnion and lower vat insert element, and the base section in fluid-tight engagement within the entry passageway.

This invention additionally comprises a replaceable sealing system for more effective fluid-tight sealing of the channel means while minimizing trunnion wear. The sealing system comprises the above-described replaceable, annular-shaped sealing device, and further includes an axially-extending retaining means. The retaining means directs axial forces to the radially-extending leg section for maintaining the inner radial surface of the leg section in securing engagement with the outer end of either of the respective trunnion and lower insert vat element.

Preferably, the retaining means comprises a plurality of axially-extending bolt means. Each of the bolt means are attached at one end to a portion of the leg section of the sealing means. The outer radial surface of the leg section preferably includes a plurality of annularly-arranged, axially-extending apertures. Each of these apertures is adapted to receive the free end of the axially-extending bolt means which passes therethrough and attaches to the leg section. The outer radial surface of the leg section is preferably connected to an annular-shaped backing flange means. The backing flange means, which includes substantially identical apertures to those located in the leg section, is attached to the other end of the bolt means. The retaining means preferably includes spring means disposed between the respective drum filter and the outer radial surface of the leg section for facilitating the securing engagement of the inner radial surface of the leg section with the outer end of either of the respective trunnion and lower vat insert element.

The foregoing and other objects, features, and advantages of the invention will become more apparent from the following detailed description of a preferred embodiment which proceeds with reference to the accompanying drawings.

DETAILED DESCRIPTION OF THE PREFERRED EMBODIMENT

Figure 1:
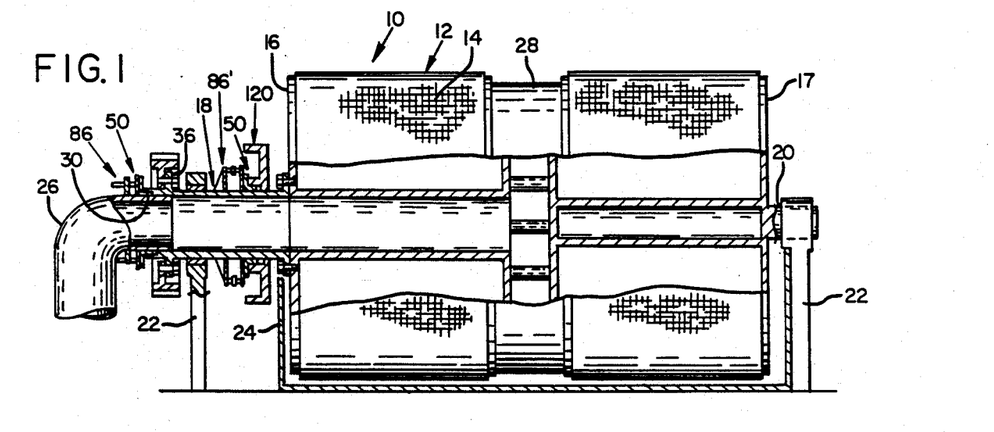
FIG. 1 is a front elevational view of a rotary drum filter of the type having a hollow trunnion rotatably connected to a vacuum pipe at one end with the surface portions of the drum broken away to show interior portions of the drum in section.

Referring now to FIG. 1, a conventional rotary drum filter 10 includes a cylindrical filter drum 12 having an outer cylindrical filter surface 14 and opposite end walls 16, 17. The drum is mounted for rotation about a central axis on trunnions 18, 20 by supports 22 so that as the drum rotates, its filter surface passes through a pulp slurry within a tank 24.

Trunnion 18 is hollow, bolted at its inner end to drum end wall 16 and rotatably connected at its outer end to a stationary discharge vacuum pipe 26 connected to a source of the vacuum (not shown) for draining filtrate liquid from the surface of the drum. The filtrate passes from such surface in the well known manner through a valve structure 28 and through suitable passages (not shown) within the interior of the drum. It then exits the filter drum through hollow trunnion 18 to vacuum pipe 26.

Figure 3:
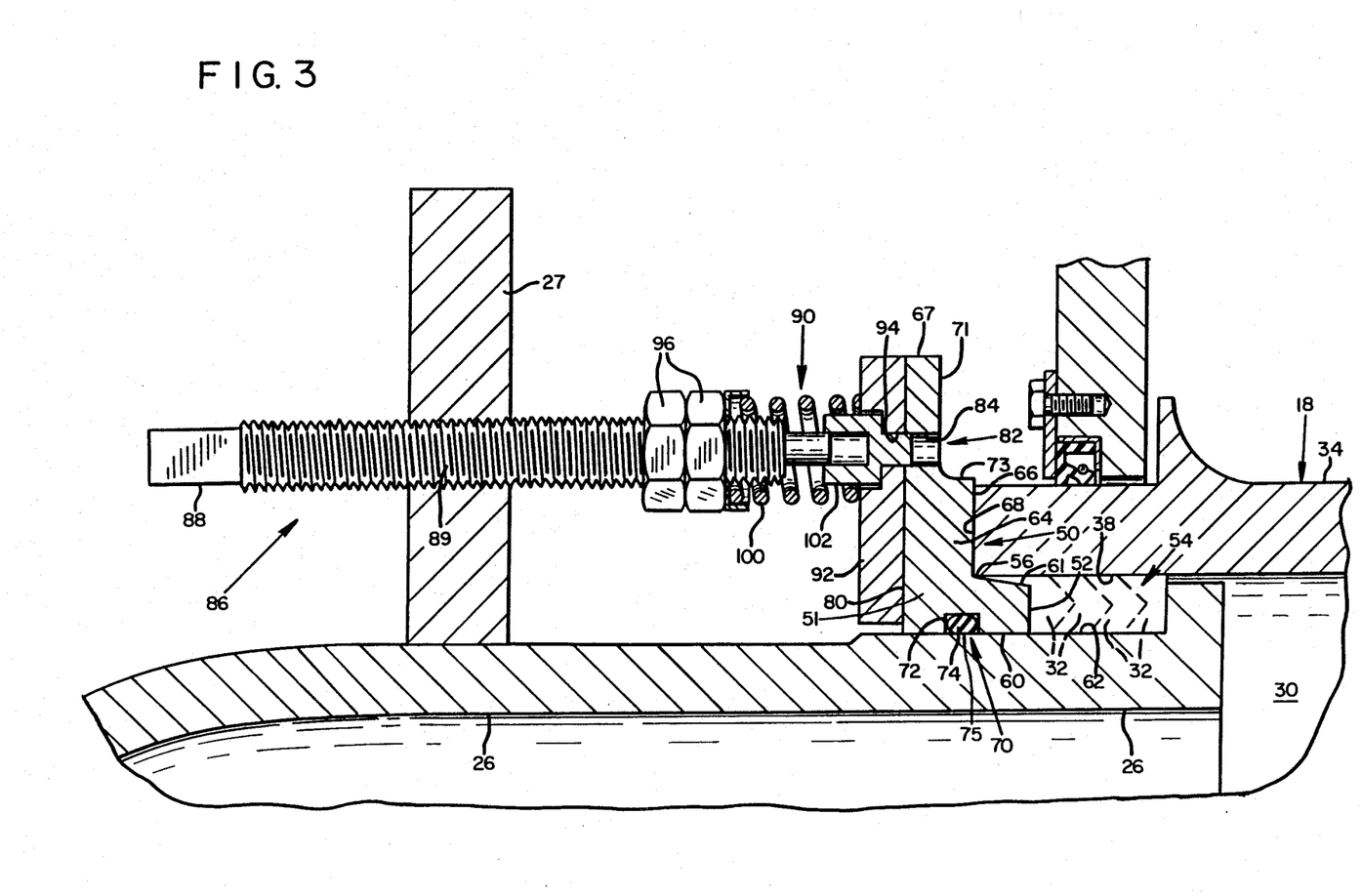
FIG. 3 is an enlarged sectional view of the replaceable sealing system of the present invention in sealing engagement within entry passageway 56 located between the outer surface of discharge pipe 26 and the inner surface of trunnion 18.
Figures 4, 5:
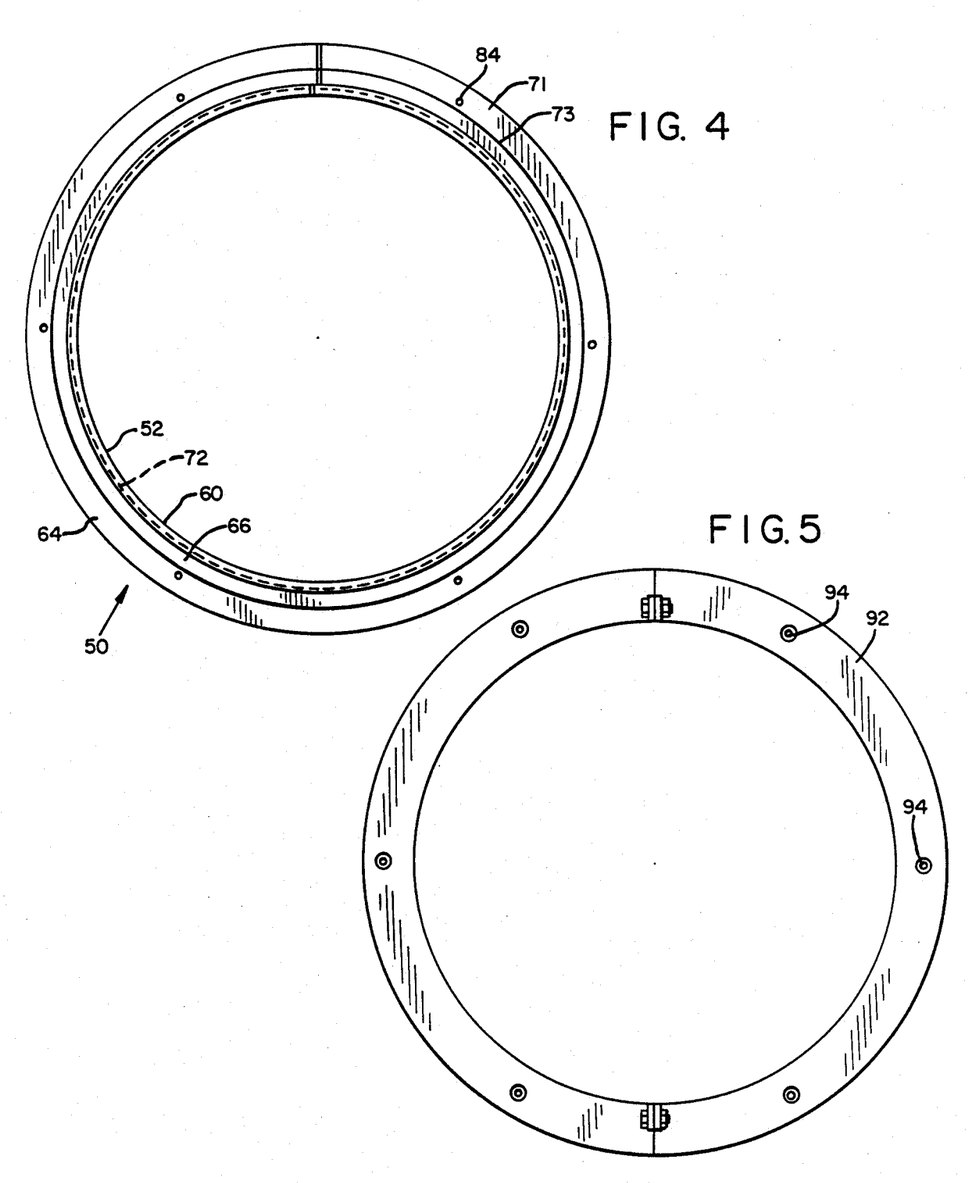
FIG. 4 is a front elevational view of the replaceable sealing means of this invention.
FIG. 5 is a front elevational view of annular-shaped backing flange 94.

As best shown in FIG. 3, hollow trunnion 18 has an open outer end 30 through which the upper end portion of discharge vacuum pipe 26 is received within the interior of the trunnion 18. An annularly-shaped, axially-extending channel 54 is formed between discharge pipe 26 and hollow trunnion 18, respectively, and extends axially from the rotatable connection of the respective discharge pipe and hollow trunnion to the outer end 68 of hollow trunnion 18. An annularly-shaped entry passageway 56 is formed at the entrance to channel 54. Trunnion 18 has a main body portion 34, typically fabricated of mild steel and the like, including an outer trunnion flange 36 provided for connecting the trunnion to the driving means for rotating the connected drum. Trunnion 18 has a cylindrical inner wall 38 extending from the open outer end 30 to an open inner end.

Figure 2:
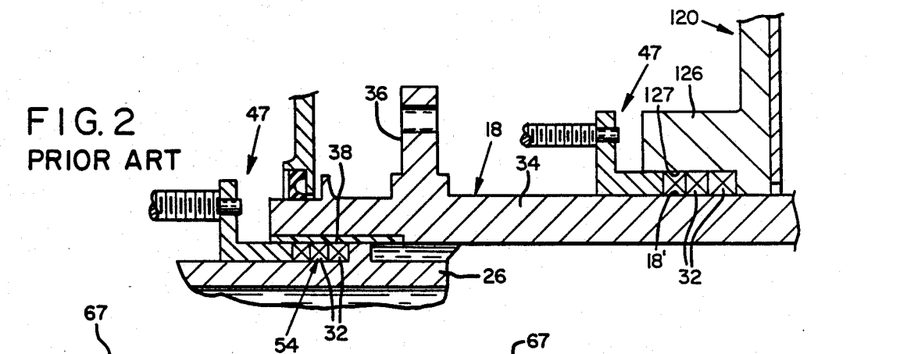
FIG. 2 is an enlarged sectional view of a prior art sealing system including follower system 47 and abrasive packing material 32 for sealing channel 54.

In conventional application, see FIG. 2, the prior art stationary abrasive packing material 32 fills the channel 54 between the outer surface of vacuum pipe 26 and the inner wall 38 of the trunnion 18, as well as between the inner surface 127 of the inner axially-extending vat insert element 126 to provide fluid-tight sealing of channel 54. The stationary packing material 32 bears against, for instance, the inner wall of the trunnion, subjecting same to substantial abrasive wear, and is held in place within channel 54 using packing follower assembly 47.

Referring now to FIGS. 3-6, a replaceable sealing means 50 for providing a more effective fluid-tight sealing of channel 54 is depicted. Sealing means 50 comprises a replaceable, annular-shaped sealing device 51 having a generally L-shaped radial cross-sectional configuration. The L-shaped radial cross section of the sealing device 51 comprises an annularly-shaped, axially-extending base section 52 which extends within and effectively seals off entry passageway 56. The sealing-off function is effected by the securing engagement of the lower axial surface 60 of base section 52 with the outer surface 62 of stationary discharge pipe 26. Stationary vacuum discharge valve mount 27 is attached to the outer surface of discharge pipe 26.

At the same time, a radially-extending leg section 64 of sealing device 51 effectively maintains the sealing device in a substantially fixed position within entry passageway 56 by securing engagement of the inner radial surface 66 of leg section 64 with the outer end 68 of trunnion 18. Radially-extending leg section 64 includes, in cross section, disposed between inner radial surface 66 and outer circumferentially-extending surface 67, indented radial and axial surfaces 71 and 73, respectively.

The upper axial surface 61 of base section 52 extends axially at a downward angle from its inner end 63 to its outer end 65. Because of this annular disposition of the upper surface of base section 52, the inner surfaces 38 of trunnion 18 do not substantially engage one another thereby minimizing trunnion wear.

Figure 6:
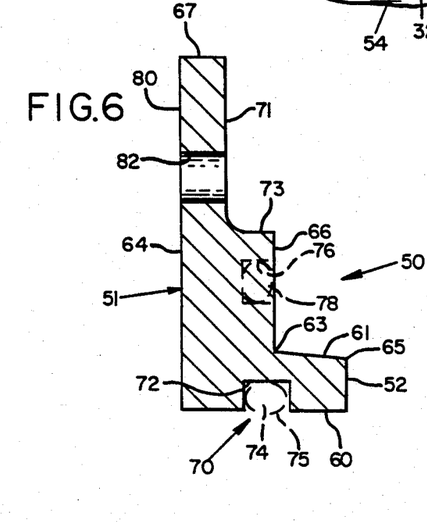
FIG. 6 is a sectional view of the radial L-shaped cross-sectional configuration of a replaceable sealing means of this invention.

Lower axial surface 60 preferably includes flexible engagement means 70 for providing further securing engagement between a base section 52 and outer surface 62, respectively. Typically, the lower axial surface 60 includes a circumferentially-extending slot means 72 having disposed therewithin a circumferentially-extending flexible annular ring 74. The lower portion 75 of annular ring 74 extends slightly below the surface of lower axial surface 60. Therefore, when base section 52 is disposed within entry passageway 56, annular ring 74 will be deformed to the extent that lower portion 75 extends below lower axial surface 60. Further, as seen in FIG. 6, flexible engagement means 70 can be added within lower axial surface 60 and/or, as in the case of circumferentially-extending annular ring 78, disposed within circumferentially-extending slot means 76, and can also be located in inner radial surface 66.

Radially-extending leg section 64 includes outer radial surface 80. Leg section 64 also can include a plurality of annularly arranged means 82 for receiving a plurality of annularly-arranged retainer means 86. Preferably, receiving means 82 comprises a plurality of axially-extending apertures which are annularly-arranged about radially-extending leg section 64.

Retainer means 86 are provided for imparting axially-directed forces to replaceable sealing device 51, more particularly to radially-extending leg section 64. Retaining means 86 preferably comprises axially-extending bolt means 88 connected to leg section 64. As depicted in FIG. 3, axially-extending bolt means 88 comprises a bolt section 89 joined to one end of spring means 90, which in this case comprise compression spring means 100, by jam nuts 96. A bolt extension means 102, attached to the other end of said spring means 90, is connected to an annular-shaped backing flange 92. Backing flange 92 includes a plurality of annularly-arranged backing flange apertures 94.

In operation, the hollow trunnion 18 is joined to end wall 16 of the filter drum, as shown in FIG. 1. The upper end of vacuum pipe 26 extends into the open outer end 30 of the trunnion and a fluid-tight seal is achieved by inserting the sealing means 50 into entry passageway 56 so that inner radial surface 66 and lower axial surface 60 respectively securingly engage trunnion outer end 18 and discharge pipe lower axial surface 60. Contrary to the prior art, there is no requirement for the use of packing material 32 and the like within the channel 54 in order to effect fluid-tight sealing.

Figures 8, 9, 10, 11:
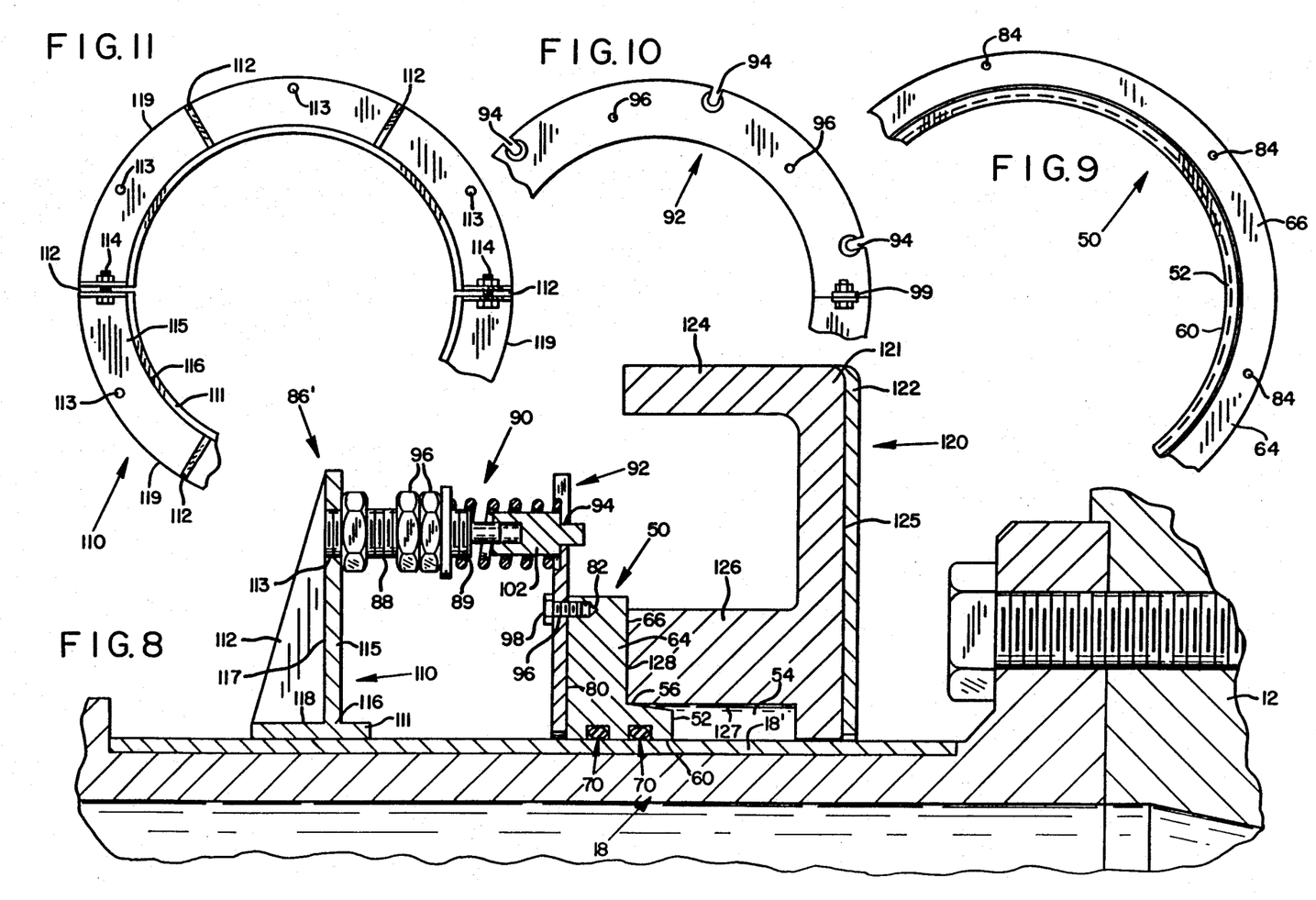
FIG. 8 is an enlarged sectional view of the replaceable sealing system of this invention in sealing engagement within entry passageway 56 formed between inner vat insert element 126 and trunnion outer surface 18'.
FIG. 9 is a front elevational sectional view of the replaceable sealing means 50 of FIG. 8.
FIG. 10 is a front elevational sectional view of the backing flange 92 of FIG. 8.
FIG. 11 is a front elevational sectional view of the mounting ring assembly 110 of FIG. 8.

If the sealing means 50 does need to be replaced, the trunnion bolts are unthreaded from the outer end 68 of the trunnion. Each of the retaining means 86 is then disconnected by unthreading jam nuts 96 and disengaging axially-extending bolt means 88. This releases the interlocking axial-directed forces imparted by spring means 90 to leg section 64 and allows the sealing means 50 to be easily removed from within the confines of trunnion 18. A new sealing means of substantially identical construction can then be inserted within entry passageway 56 as previously described. As shown in FIG. 9, leg section 64 includes a plurality of axially-extending apertures 84.

Referring now to FIGS. 8–11, another form of the replaceable sealing system is described. As more specifically shown in FIGS. 1 and 8, a vat insert assembly 120 is disposed axially about trunnion 18. Vat insert assembly 120 comprises a generally annularly-shaped, radially-extending vat wall 122 joined at its inner radial surface 125 to vat insert member 121. Vat insert member 121 comprises outer axially-extending vat insert element 124 and inner axially-extending vat insert element 126. Inner vat insert element surfaces 127 and 128 are respectively adjacent to entry passageway 56 and inner radial surface 66. A means defining an annularly-shaped, axially-extending channel 54 is disposed between inner vat insert element 126 and the outer surface 18' of trunnion 18.

Figure 7:
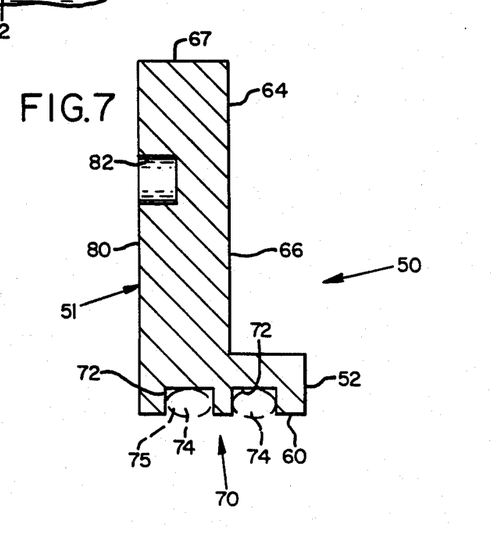
FIG. 7 is a sectional view of the radial L-shaped cross-sectional configuration of another replaceable sealing means.

A replaceable sealing means 50 for providing a more fluid-tight sealing of channel 54 is depicted in FIG. 8. Sealing means 50 is similar in construction to the device depicted in FIG. 7 and previously described herein. The sealing means 50 is connected at its outer radial surface 80 to an annular-shaped backing flange 92. More specifically, attachment means 98 passes through aperture 96 of flange 92 and is securely maintained within receiving means 82 of sealing means 50. A plurality of annularly-arranged backing flange apertures 94 are also provided at the outer radial surface of flange 92 for receiving a plurality of retainer means 86' which impart axially-directed forces to replaceable sealing device 50. Flange 92 is fabricated in sections which are held in position during use by backing flange attachment means 99. Retainer means 86' are of similar construction to retainer means 86 shown in FIG. 3. In this case, bolt extension means 102 are located within backing flange apertures 94 at one end of the retaining means 86', and at the other end, are connected to a plurality of annularly-shaped, axially-extending mounting ring assemblies 110 by attachment within apertures 113. More specifically, the mounting ring assembly 110 comprises an annularly-shaped base member 111 which is connected to and extends radially about trunnion 18. Base member 111 forms the inner annular surface of mounting ring assembly 110. (See FIG. 11.) An annularly-shaped ring 115 is connected at its inner end 116 to base member 111. A plurality of annularly-disposed apertures 113 are located about ring 115. A plurality of stiffening elements 112 are joined to the outer radial surface 117 of ring 115 and to the outer radial surface 118 of base member 111, respectively. Locking bolts 114 retain in locked position semicircular portions 119 of ring assembly 110. In this way, retaining means 86' can be held in retaining position locking backing flange 92 against replaceable sealing means 50, thereby holding same in position within passageway 56 of channel means 54.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A rotary vacuum filter comprising:
    a cylindrical filter drum with trunnions at opposite ends, said filter drum being mounted for rotation about a central axis, one of said trunnions being hollow and rotatably connected to an end portion of a stationary discharge pipe in communication with means defining a source of vacuum to drain filtrate material from said drum during its rotation, said vacuum filter further including a vat insert assembly extending radially about said hollow trunnion which includes a radially-extending vat wall joined to a vat insert member, said vat insert member including concentrically-disposed respective inner and outer axially-extending annularly-shaped vat insert elements;
    means defining an annularly-shaped, axially-extending channel formed between the respective outer surface of said discharge pipe and the inner wall of said hollow trunnion;
    means defining an annularly-shaped, radially-extending channel formed between the respective inner surface of said inner vat insert element and said outer surface of said hollow trunnion;
    a replaceable sealing means for providing more effective fluid-tight sealing of either of said channel means and for maintaining the vacuum within said filter drum at an effective and efficient level, while at the same time substantially minimizing trunnion wear which comprises a replaceable, annular-shaped sealing device, fabricated of a nonabrasive material, having an L-shaped radial cross-sectional configuration for effecting the fluid-tight sealing of an annularly-shaped entry passageway formed at the entrance to either of said channel means,
    said L-shaped radial cross section of said sealing device comprising an axially-extending base section capable of extending within and effectively sealing off either said entry passageway, without requiring conventional abrasive packing material, by the securing engagement of the lower axial surface of said base section with the outer surface of either of said respective stationary discharge pipe and said trunnion, and a radially-extending leg section capable of facilitating the effective sealing of either said entry passageway and for effectively maintaining said sealing device in a substantially fixed position within either said entry passageway by the securing engagement of the inner radial surface of said leg section with the outer end of either of said respective trunnion and said inner vat insert element.

2. The rotary vacuum filter of claim 1, wherein said lower axial surface includes flexible engagement means for providing further securing engagement between said base section and the outer surface of either of said respective discharge pipe and said trunnion.

3. The rotary vacuum filter of claim 2, wherein said lower axial surface includes at least one circumferentially-extending slot means and said flexible engagement means comprises at least one circumferentially-extending flexible annular ring disposed within each of said slot means.

4. The rotary vacuum filter of claim 1, wherein said inner radial surface includes flexible engagement means for providing further securing engagement between said leg section and the outer end of either said respective trunnion and said inner vat insert element.

5. The rotary vacuum filter of claim 4, wherein said inner radial surface includes at least one annularly-extending slot means and said flexible engagement means comprises at least one annularly-extending flexible annular ring disposed within each of said slot means.

6. The rotary vacuum filter of claim 1, wherein said radially-extending leg section includes means for receiving retaining means for imparting axially-directed forces to said sealing means for maintaining said inner radial surface of said leg section in securing engagement with the outer end of either of said respective trunnion and said inner vat insert element, which in turn provides for maintaining the fluid-tight engagement of said base section within said entry passageway.

7. The rotary vacuum filter of claim 1, wherein the outer radial surface of said leg section includes means defining a plurality of annularly-arranged, axially-extending apertures capable of receiving retaining means for providing axially-directed forces to said replacement sealing means for maintaining said inner radial surface of said leg section in securing engagement with the outer end of either of said respective trunnion and said inner vat insert element, which in turn provides for maintaining the fluid-tight engagement of said base section within said entry passageway.

8. The rotary vacuum filter of claim 1, wherein said sealing means is fabricated of a nonabrasive, high-strength polymeric material.

9. A method for the effective fluid-tight sealing of means defining channels in a rotary vacuum filter, while minimizing trunnion wear, which comprises:
providing said rotary vacuum filter including a cylindrical filter drum with trunnions at opposite ends, said filter drum being mounted for rotation about a central axis, one of said trunnions being hollow and rotatably connected to an end portion of a stationary discharge pipe in communication with a source of vacuum to drain filtrate material from said drum during its rotation, said vacuum filter further including a vat insert assembly extending radially about said hollow trunnion which comprises a radially-extending vat wall joined to a vat insert member, said vat insert member including concentrically-disposed respective inner and outer axially-extending annularly-shaped vat insert elements; said channel means comprising means defining an annularly-shaped, axially-extending channel formed between the respective outer surface of said discharge pipe and the inner surface of said hollow trunnion, and means defining an annularly-shaped, radially-extending channel formed between the respective inner surface of said inner vat insert element and said outer surface of said hollow trunnion; and
inserting a replaceable, annular-shaped sealing device, fabricated of a nonabrasive material, having an L-shaped radial cross-sectional configuration in fluid-tight sealing engagement within an entry passageway formed at the entrance to said channel means,
said L-shaped radial cross section of said sealing device comprising an axially-extending base section extending within said entry passageway for effectively sealing off said entry passageway, without requiring the use of conventional abrasive packing material, by the securing engagement of the lower axial surface of said base section with the outer surface of either of said respective stationary discharge pipe and said trunnion, and a radially-extending leg section which effectively maintains said sealing device in a substantially fixed position within said entry passageway by the securing engagement of the inner radial surface of said leg section with the respective outer end of either of said respective trunnion and said inner vat insert element.

10. The method of claim 9, which further includes the step of providing said lower axial surface with flexible engagement means for further securing engagement between said base section and the outer surface of either said respective discharge pipe and said trunnion.

11. The method of claim 10, which further includes the step of providing said lower axial surface with at least one circumferentially-extending slot means including at least one circumferentially-extending flexible annular ring disposed within each of said slot means.

12. The method of claim 9, which further includes the step of providing in said replaceable sealing means, means for receiving axially-directed forces for maintaining said inner radial surface of said leg section in securing engagement with the outer end of either of said respective trunnion and said inner vat insert element, and in turn maintaining the fluid-tight engagement of said base section with said entry passageway.

13. The method of claim 9, wherein said sealing device is fabricated of a nonabrasive, high-strength polymeric material.

14. A rotary vacuum filter comprising:
a cylindrical filter drum with trunnions at opposite ends, said filter drum being mounted for rotation about a central axis, one of said trunnions being hollow and rotatably connected to an end portion of a stationary discharge pipe in communication with means defining a source of vacuum to drain filtrate material from said drum during its rotation, said vacuum filter further including a vat insert assembly extending radially about said hollow trunnion which comprises a radially-extending vat wall joined to a vat insert member, said vat insert member including concentrically-disposed respective inner and outer axially-extending, annularly-shaped vat insert elements;

means defining an annularly-shaped, axially-extending channel formed between the respective outer surface of said discharge pipe and the inner surface of said hollow trunnion; and means defining an annularly-shaped, axially-extending channel formed between the respective inner surface of said inner vat insert element and said outer surface of said hollow trunnion;

a replacement sealing means system for providing more effective fluid-tight sealing of either said channel means and for maintaining the vacuum within said filter drum at an effective and efficient level, while at the same time substantially minimizing trunnion wear which comprises a replaceable, annular-shaped sealing device, fabricated of a nonabrasive material, having an L-shaped radial cross-sectional configuration for effecting the fluid-tight sealing of an annularly-shaped entry passageway formed at the entrance to either of said channel means, said L-shaped radial cross section of said sealing device comprising an axially-extending base section capable of extending within and effectively sealing off either said entry passageway, without requiring conventional abrasive packing material, by the securing engagement of the lower axial surface of said base section with the outer surface of either of said respective stationary discharge pipe and said trunnion, and a radially-extending leg section capable of facilitating the effective sealing of either said entry passageway and for effectively maintaining said sealing device in a substantially fixed position within either said entry passageway by the securing engagement of the inner radial surface of said leg section with the outer end of either of said respective trunnion and said inner vat insert element, and an axially-extending retaining means for providing axially-directed forces to said radially-extending leg section for maintaining said inner radial surface of said leg section in securing engagement with the outer end of either of said respective trunnion and said inner vat insert element, which in turn provides for maintaining the fluid-tight engagement of said base section within said entry passageway.

15. The rotary vacuum filter of claim 14, wherein said retaining means comprises a plurality of axially-extending bolt means, each said bolt means being attached at one end to said leg section.

16. The rotary vacuum filter of claim 15, wherein said outer radial surface of said leg section includes means defining a plurality of annularly-arranged, axially-extending apertures, each of said aperture means having said axially-extending bolt means passing therethrough and attaching to said leg section.

17. The rotary vacuum filter of claim 16, wherein said outer radial surface of said leg section is joined to a backing flange means by said bolt means.

18. The rotary vacuum filter of claim 14, wherein said retaining means includes spring means disposed between said respective drum filter and the outer radial surface of said leg section for facilitating the securing engagement of said inner radial surface of said leg section with the outer end of either of said respective trunnion and said inner vat insert element.

19. The rotary vacuum filter of claim 14, wherein said sealing means is fabricated of a nonabrasive, high-strength polymeric material.

20. A method for the effective fluid-tight sealing of means defining channels in a rotary vacuum filter, while minimizing trunnion wear, which comprises:

providing said rotary vacuum filter including a cylindrical filter drum with trunnions at opposite ends, said filter drum being mounted for rotation about a central axis, one of said trunnions being hollow and rotatably connected to an end portion of a stationary discharge pipe in communication with a source of vacuum to drain filtrate material from said drum during its rotation, said vacuum filter further including a vat insert assembly extending radially about said hollow trunnion which comprises a radially-extending vat wall joined to a vat insert member, said vat insert member including concentrically-disposed respective inner and outer axially-extending annularly-shaped vat insert elements, said channel means comprising means defining an annularly-shaped, axially-extending channel formed between the respective outer surface of said discharge pipe and the inner surface of said hollow trunnion, and means defining an annularly-shaped, axially-extending channel formed between the respective inner surface of said inner vat insert element and said outer surface of said hollow trunnion;

inserting a replaceable, annular-shaped sealing device, fabricated of a nonabrasive material, having an L-shaped radial cross-sectional configuration in fluid-tight sealing engagement within an entry passageway formed at the entrance of said channel means, said L-shaped radial cross section of said sealing device comprising an axially-extending base section extending within said entry passageway and effectively sealing off said entry passageway, without requiring the use of conventional abrasive packing material, by the securing engagement of the lower axial surface of said base section with the outer surface of either of said respective stationary discharge pipe and said trunnion, and a radially-extending leg section which effectively maintains said sealing device in a substantially fixed position within said entry passageway by the securing engagement of the inner radial surface of said leg section with the respective outer end of either of said respective trunnion and said inner vat insert element; and providing axially-directed forces to the outer radially-extending leg section for maintaining said inner radial surface of said leg section in communication with the outer end of either of said respective trunnion and inner vat insert element, which in turn provides for maintaining the fluid-tight engagement of said base section within said entry passageway.

21. The method of claim 20, wherein said sealing device is fabricated of a nonabrasive, high-strength polymeric material.

22. A rotary drum filter comprising:

a cylindrical filter drum with trunnions at opposite ends, said rotary drum filter being mounted for rotation about a central axis, one of said trunnions being hollow and rotatably connected to an end portion of a stationary discharge pipe in communication with a means defining a source of vacuum to drain filtrate material from said drum during its rotation, said vacuum filter further including a vat insert assembly extending radially about said hollow trunnion which includes a radially-extending vat wall joined to a vat insert member, said vat insert member including concentrically-disposed respective inner and outer axially-extending, annularly-shaped vat insert elements;

means defining an annularly-shaped, axially-extending channel formed between the respective outer surface of said discharge pipe and the inner wall of said hollow trunnion;

means defining an annularly-shaped, radially-extending channel formed between the respective inner surface of said inner vat insert element and said outer surface of said hollow trunnion;

a replaceable sealing device fabricated of a non-abrasive material for providing more effective fluid-tight sealing of either of said channel means and for maintaining the vacuum within said filter drum at an effective and efficient level, while at the same time substantially minimizing trunnion wear; and means for applying axially-directed forces to said replaceable sealing device, which comprises a plurality of axially-extending retaining means engaging said replaceable sealing device adapted for imparting axially-directed forces to the outer radially-extending surface of said replaceable sealing device to provide fluid-tight sealing thereof, without requiring the use of conventional abrasive packing material.

23. The rotary drum filter of claim 22, which further comprises a plurality of axially-extending bolt means, each said bolt means being attached at one end to said drum filter and being attached at the other end to said sealing device.

24. The rotary drum filter of claim 23, wherein said sealing device comprises an L-shaped radial cross-sectional configuration including an axially-extending base section and a radially-extending leg section for effecting the fluid-tight sealing of an annularly-shaped entry passageway formed at the entrance to either of said channel means; and the outer radial surface of said leg section including means defining a plurality of annularly-arranged, axially-extending apertures, each of said apertures having the other end of said axially-extending bolt means passing therethrough and attaching to said leg section.

25. The rotary drum filter of claim 24, wherein said outer radial surface of said leg section is connected to a backing flange means which in turn is attached to the other end of said bolt means.

26. The rotary drum filter of claim 24, which further includes spring means disposed between said respective drum filter and the outer radial surface of said leg section for facilitating the securing engagement of the inner radial surface of said leg section with the outer end of said trunnion.

27. The rotary drum vacuum filter of claim 22, wherein said sealing device is fabricated on a nonabrasive, high-strength polymeric material.

28. A fluid-tight rotary vacuum filter which comprises:

a cylindrical filter drum mounted for rotation about a central axis, a pair of trunnions at opposite ends of said cylindrical filter drum, one of said trunnions being hollow and rotatably connected to an end portion of a stationary discharge pipe in communication with means defining a source of vacuum to drain filtrate material from said drum during its rotation, said hollow trunnion being worn to an extent that said filtrate material cannot be effectively maintained in a fluid-tight state by the use of conventional abrasive packing material, means defining an annularly-shaped, axially-extending channel formed between the respective outer surface of said discharge pipe and the inner surface of said hollow trunnion, and a replaceable sealing means fabricated of a nonabrasive material, for providing effective fluid-tight sealing of said channel means and for maintaining the vacuum within said filter drum at an effective and efficient level, without requiring the use of conventional abrasive stationary packing material, while at the same time substantially minimizing trunnion wear, which comprises a replaceable, annular-shape sealing means having an L-shaped radical cross-sectional configuration for effecting the fluid-tight sealing of means defining an annularly-shaped entry passageway formed at the entrance to said channel means, said L-shaped radial cross section of said sealing means comprising an axially-extending base section capable of extending within and effectively sealing off said entry passageway by the securing engagement of the lower axial surface of said base section with the outer surface of said stationary discharge pipe, and a radially-extending leg section capable of facilitating the effective sealing of said entry passageway and for effectively maintaining said sealing device in a substantially fixed position within said entry passageway by the securing engagement of the inner radial surface of said leg section with the outer end of said trunnion.

29. The fluid-tight rotary vacuum filter of claim 28, wherein said sealing means is fabricated on a nonabrasive polymeric material.

30. A method for the effective fluid-tight sealing of means defining a channel in a rotary drum filter, while minimizing trunnion wear, which comprises:

providing a fluid-tight rotary vacuum filter which comprises a cylindrical filter drum mounted for rotation about a central axis, a pair of trunnions at opposite ends of said cylindrical filter drum, one of said trunnions being hollow and rotatably connected to an end portion of a stationary discharge pipe in communication with a source of vacuum of drain filtrate material from said drum during its rotation, said hollow trunnion being worn to the extent that said filtrate material cannot be effectively maintained in a fluid-tight state by the use of conventional abrasive packing material, said channel means comprising means defining an annularly-shaped, axially-extending channel formed between the respective outer surface of said discharge pipe and the inner surface of said hollow trunnion, said filtrate material passing through said channel means without being effectively contained by said packing material in a fluid-tight state; and inserting a replaceable, annular-shaped sealing device fabricated of a nonabrasive material, having an L-shaped radial cross-sectional configuration in fluid-tight sealing engagement within an entry passageway formed at the entrance to said channel means, without requiring conventional abrasive packing material, said L-shaped radial cross section of said sealing device comprising an axially-extending base section extending within said entry passageway and effectively sealing off said entry passageway, by the securing engagement of the lower axial surface of said base section with the outer surface of either of said respective stationary discharge pipe and said trunnion, and a radially-extending leg section which effectively maintains said sealing device in a substantially fixed position within said entry passageway by the securing engagement of the inner radial surface of said leg section with the respective outer end of either of said respective trunnion and said inner vat insert element.

31. The method of claim 30, wherein said sealing device is fabricated of a nonabrasive, high-strength polymeric material.

* * * * *